United States Patent [19]

Nishino et al.

[11] Patent Number: 4,578,256

[45] Date of Patent: Mar. 25, 1986

[54] PROCESS FOR REMOVAL OF POISONOUS GASES

[75] Inventors: Hiroshi Nishino, Suita; Toshio Aibe, Kashima, both of Japan

[73] Assignee: Takeda Chemical Industries, Ltd., Osaka, Japan

[21] Appl. No.: 653,093

[22] Filed: Sep. 21, 1984

[30] Foreign Application Priority Data

Sep. 27, 1983 [JP] Japan ................................. 58-179870

[51] Int. Cl.$^4$ .............................................. B01D 53/02
[52] U.S. Cl. .................................... 423/210; 423/248; 55/68; 55/72; 502/416; 502/417
[58] Field of Search ............... 423/210 S, 210 M, 248; 55/72, 68; 502/416, 417

[56] References Cited

U.S. PATENT DOCUMENTS 2,513,508 7/1950 Morrell et al. ...................... 502/417
2,523,875 9/1950 Morrell et al. ...................... 502/417
4,048,387 9/1977 Lahme et al. ................... 423/210 S

FOREIGN PATENT DOCUMENTS 89837 7/1981 Japan .

OTHER PUBLICATIONS

The Journal of Industrial and Engineering Chemistry, vol. 11, No. 5 (1919) 420–438.

Primary Examiner—John Doll
Assistant Examiner—Robert L. Stoll
Attorney, Agent, or Firm—Wenderoth, Lind & Ponack

[57] ABSTRACT

Hydrides of As, B, P, Sb or Se in a gas can easily be removed from the gas by contacting the gas with an adsorbent comprising activated carbon having (1) iodine and/or one or more kinds of iodine compounds and/or (2) one or more kinds of sulfates and nitrates of $NH_4$, Ag, Al, Ti, V, Cr, Mn, Fe, Co, Ni, Cu, Zn, Cd, Pb and Sn supported thereon.

6 Claims, No Drawings

PROCESS FOR REMOVAL OF POISONOUS GASES

This invention relates to a process of treating poisonous gases containing hydrides of B, P, As, Sb and Se.

Hydrides, such as $B_2H_6$, $PH_3$, $AsH_3$, $SbH_3$ and $H_2Se$, are utilized in large quantities for raw material gases for production of semiconductors, fumigation gases, etc., but even in trace amounts, are extremely poisonous to the human body. Therefore, the development of a method capable of efficiently removing these hydrides in gas is strongly demanded.

As a method of removing hydrides of B, P, As, Sb and Se, there have been proposed, for example, a procedure of washing with chemical solutions such as oxidizing solutions, or an adsorption process with use of adsorbents composed mainly of ferric chloride. However, these methods show inferior removal effect and pose problems.

The present inventors, in view of these circumstances, conducted intensive investigation, and as a result, found that by using activated carbon with iodine, iodine compounds and sulfates and nitrates of $NH_4$, Ag, Al, Ti, V, Cr, Mn, Fe, Co, Ni, Cu, Zn, Cd, Pb and Sn, supported thereon hydrides of B, P, As, Sb and Se in gases can be removed highly efficiently, which has culminated in the present invention.

Thus, the present invention is concerned with:

A process of removing one or more kinds of hydrides of As, B, P, Sb or Se from a gas containing one or more kinds of hydrides of As, B, P, Sb or Se, which comprises contacting said gas with an adsorbent comprising activated carbon having (1) iodine and/or one or more kinds of iodine compounds (hereinafter referred to in some instances as "First Component") and/or (2) one or more kinds of sulfates and nitrates of $NH_4$, Ag, Al, Ti, V, Cr, Mn, Fe, Co, Ni, Cu, Zn, Cd, Pb and Sn (hereinafter referred to in some instances as "Second Component") supported thereon.

The activated carbon which is useful in the present invention may be any type of activated carbon produced by the known processes from coal, coke, wood charcoal, coconut shells, resins, etc., while its specific surface area is preferably within the range from 200 to 2000 m²/g. With reference to its shape and form, use is suitably made for example of spherical- and cylindrical-formed, crushed, powdered and fibrous-formed activated carbon according to the type of gas treatment methods.

Specific examples of the First Component useful in the present invention, include iodides, such as LiI, NaI, KI, RbI, CsI, $BeI_2$, $MgI_2$, $CaI_2$, $SrI_2$, $BaI_2$, $NH_4I$ and HI, iodic acid and its salts, such as $HIO_3$, $NH_4IO_3$, $NaIO_3$ and $KIO_3$, periodic acid and its salts, such as $HIO_4$, $NH_4IO_4$, $NaIO_4$ and $KIO_4$, and iodine oxides, such as $I_2O_5$ and $IO_2$.

Specific examples of the Second Component, which is utilizable, include $(NH_4)_2SO_4$, $Ag_2SO_4$, $Al_2(SO_4)_3$, $Ti_2(SO_4)_3$, $VOSO_4$, $Cr_2(SO_4)_3$, $MnSO_4$, $FeSO_4$, $Fe_2(SO_4)_3$, $CoSO_4$, $NiSO_4$, $CuSO_4$, $ZnSO_4$, $CdSO_4$, $PbSO_4$, $SnSO_4$, $NH_4NO_3$, $AgNO_3$, $Al(NO_3)_3$, $Cr(NO_3)_3$, $Mn(NO_3)_2$, $Fe(NO_3)_2$, $Fe(NO_3)_3$, $Co(NO_3)_2$, $Ni(NO_3)_2$, $Cu(NO_3)_2$, $Zn(NO_3)_2$, $Cd(NO_3)_2$, $Pb(NO_3)_2$, etc.

The adsorbent used in the present invention, which comprises activated carbon having each of the components being supported thereon, can be produced by impregnating or spraying activated carbon with a solution or suspension of the individual components in water (inclusive of aqueous acid or alkali solutions) or various solvents (e.g., alcohols, such as methanol and ethanol, ketones, such as acetone and methyl ethyl ketone, etc.), and if necessary, by drying the impregnated or sprayed activated carbon at a temperature of not higher than about 130° C. or calcining at a temperature of not lower than 130° C.

In cases in which not less than two components are deposited on activated carbon, the components may be supported simultaneously or may be supported individually, whereby they may be supported in arbitrary order.

The supported amounts of each of the First and Second Components in activated carbon are 1 mg to 500 mg per g of activated carbon (0.5 mg to 250 mg for silver sulfate and silver nitrate), preferably 5 to 400 mg (1 to 150 mg for silver sulfate and silver nitrate).

The present invention is usually carried out by contacting a gas containing hydrides of B, P, As, Sb and Se with the adsorbent in the presence of oxygen.

The contact temperature is not higher than 150° C., preferably −10° to 120° C., more preferably 0° to 100° C., and the contact pressure is not more than 10 atm., preferably 0.01 to 5 atm., with the contact time being 1/20 to 100 seconds as converted at 25° C. and 1 atm., preferably 1/10 to 50 seconds.

If oxygen is not contained in the gas to be treated, it is preferable to add oxygen to the gas. The amount of oxygen contained in the gas is usually not less than one mol per mol of hydrides of B, P, As, Sb and Se, preferably not less than 2 mol.

The contacting of the adsorbent with a gas containing hydrides of B, P, As, Sb and Se can be conducted for example by use of fixed bed, moving bed and fluidized bed.

The examples are described below to illustrate the present invention more specifically.

EXAMPLE 1

Activated carbon $A_0$ of 16 to 24 mesh having a BET specific surface area of 1,150 m²/g was sprayed uniformly with aqueous solutions or suspensions of the required amounts of iodine, iodine compounds and/or sulfates and nitrates of $NH_4$, Ag, Al, Ti, V, Cr, Mn, Fe, Co, Ni, Cu, Zn, Cd, Pb and Sn, and then dried at 110° C.

15 ml each of the various adsorbents thus obtained were packed into columns of 1.6 cm in diameter made of glass, respectively, and the atmospheric air (with relative humidity of 60%) of 30° C. containing 15 ppm of $AsH_3$ and 15 ppm of $PH_3$ was passed through the respective columns at a linear flow rate of 40 m/sec to conduct the individual adsorption break-through tests for $AsH_3$ or $PH_3$, whereby the removal ratios for $AsH_3$ or $PH_3$ at each of the determined times were measured. The results are as shown in Table 1.

TABLE 1

| Adsorbent | The first component and its amount | The second component and its amount | Percent removal of $AsH_3$ at the elapsed time shown below (%) | Percent removal of $PH_3$ at the elapsed time shown below (%) |
| --- | --- | --- | --- | --- |

TABLE 1-continued

| No. | (mg/g) | (mg/g) | 5 hrs. | 10 hrs. | 30 hrs. | 5 hrs. | 10 hrs. | 30 hrs. |
|---|---|---|---|---|---|---|---|---|
| $A_0$ (Control) | 0 | 0 | 35 | 5 | 0 | 4 | 0 | 0 |
| $A_1$ (The present invention) | LiI-50 | 0 | 100 | 85 | 68 | 93 | 61 | 40 |
| $A_2$ (The present invention) | NaI-50 | 0 | 100 | 88 | 70 | 91 | 65 | 47 |
| $A_3$ (The present invention) | KI-50 | 0 | 100 | 100 | 100 | 100 | 100 | 100 |
| $A_4$ (The present invention) | $MgI_2$-50 | 0 | 100 | 80 | 64 | 98 | 61 | 35 |
| $A_5$ (The present invention) | $BaI_2$-50 | 0 | 100 | 85 | 73 | 90 | 65 | 41 |
| $A_6$ (The present invention) | $NH_4I$-50 | 0 | 100 | 100 | 96 | 95 | 90 | 80 |
| $A_7$ (The present invention) | $NaIO_3$-50 | 0 | 100 | 100 | 100 | 100 | 85 | 64 |
| $A_8$ (The present invention) | $KIO_3$-50 | 0 | 100 | 100 | 100 | 100 | 100 | 100 |
| $A_9$ (The present invention) | $I_2$-50 | 0 | 100 | 100 | 100 | 100 | 100 | 100 |
| $A_{10}$ (The present invention) | $I_2O_5$-50 | 0 | 100 | 100 | 100 | 100 | 100 | 100 |
| $A_{11}$ (The present invention) | $HIO_3$-50 | 0 | 100 | 100 | 100 | 100 | 100 | 98 |
| $A_{12}$ (The present invention) | KI-5 | 0 | 90 | 85 | 61 | 88 | 71 | 50 |
| $A_{13}$ (The present invention) | KI-25 | 0 | 100 | 100 | 100 | 100 | 100 | 90 |
| $A_{14}$ (The present invention) | KI-400 | 0 | 100 | 100 | 100 | 100 | 100 | 100 |
| $B_1$ (The present invention) | 0 | $(NH_4)_2SO_4$-50 | 96 | 93 | 84 | 90 | 85 | 60 |
| $B_2$ (The present invention) | 0 | $AgNO_3$-5 | 100 | 98 | 90 | 98 | 85 | 53 |
| $B_3$ (The present invention) | 0 | $Al(NO_3)_3$-50 | 85 | 60 | 30 | 82 | 60 | 48 |
| $B_4$ (The present invention) | 0 | $Ti_2(SO_4)_3$-50 | 81 | 48 | 23 | 80 | 55 | 31 |
| $B_5$ (The present invention) | 0 | $VOSO_4$-50 | 98 | 83 | 53 | 87 | 65 | 43 |
| $B_6$ (The present invention) | 0 | $Cr(NO_3)_3$-50 | 88 | 65 | 43 | 75 | 50 | 32 |
| $B_7$ (The present invention) | 0 | $MnSO_4$-50 | 98 | 85 | 61 | 83 | 45 | 21 |
| $B_8$ (The present invention) | 0 | $FeSO_4$-50 | 100 | 100 | 95 | 92 | 80 | 65 |
| $B_9$ (The present invention) | 0 | $Fe(NO_3)_3$-50 | 100 | 100 | 91 | 100 | 90 | 75 |
| $B_{10}$ (The present invention) | 0 | $CoSO_4$-50 | 98 | 85 | 73 | 85 | 72 | 60 |
| $B_{11}$ (The present invention) | 0 | $Ni(NO_3)_2$-50 | 95 | 60 | 35 | 83 | 65 | 53 |
| $B_{12}$ (The present invention) | 0 | $CuSO_4$-50 | 100 | 98 | 71 | 93 | 82 | 61 |
| $B_{13}$ (The present invention) | 0 | $Zn(NO_3)_2$-50 | 95 | 80 | 63 | 83 | 60 | 46 |
| $B_{14}$ (The present invention) | 0 | $CdSO_4$-50 | 97 | 78 | 68 | 80 | 64 | 41 |
| $B_{15}$ (The present invention) | 0 | $Pb(NO_3)_2$-50 | 98 | 83 | 60 | 93 | 72 | 51 |
| $B_{16}$ (The present invention) | 0 | $SnSO_4$-50 | 100 | 95 | 70 | 95 | 68 | 43 |
| $B_{17}$ (The present invention) | 0 | $Fe_2(SO_4)_3$-50 | 100 | 95 | 90 | 100 | 75 | 47 |

| Adsorbent No. | The first component and its amount (mg/g) | The second component and its amount (mg/g) | Percent removal of $AsH_3$ at the elapsed time shown below (%) | | | Percent removal of $PH_3$ at the elapsed time shown below (%) | | |
|---|---|---|---|---|---|---|---|---|
| | | | 50 hrs. | 100 hrs. | 200 hrs. | 50 hrs. | 100 hrs. | 200 hrs |
| $C_1$ (The present invention) | NaI-50 | $AgNO_3$-50 | 100 | 100 | 100 | 100 | 100 | 100 |
| $C_2$ (The present invention) | KI-50 | $Ti_2(SO_4)_3$-50 | 100 | 100 | 85 | 100 | 98 | 79 |
| $C_3$ (The present invention) | MgI-50 | $Cr(NO_3)_3$-50 | 100 | 98 | 90 | 100 | 83 | 70 |
| $C_4$ (The present invention) | $I_2O_5$-50 | $Co(NO_3)_2$-50 | 100 | 100 | 100 | 100 | 100 | 100 |
| $C_5$ (The present invention) | $NH_4I$-50 | $SnSO_4$-50 | 100 | 100 | 85 | 100 | 100 | 81 |
| $C_6$ (The present invention) | KI-50 | $Ag_2SO_4$-5 | 100 | 100 | 88 | 100 | 100 | 100 |
| $C_7$ (The present invention) | KI-50 | $VOSO_4$-50 | 100 | 100 | 100 | 100 | 100 | 100 |

TABLE 1-continued

| | | | | | | | | |
|---|---|---|---|---|---|---|---|---|
| invention) | | | | | | | | |
| C8 (The present invention) | KI-50 | Cr2(SO4)3-50 | 100 | 100 | 100 | 100 | 100 | 100 |
| C9 (The present invention) | KI-50 | Mn(NO3)2-50 | 100 | 100 | 100 | 100 | 100 | 100 |
| C10 (The present invention) | KI-50 | Fe(NO3)2-50 | 100 | 100 | 100 | 100 | 100 | 100 |
| C11 (The present invention) | KI-50 | Co(NO3)2-50 | 100 | 100 | 100 | 100 | 100 | 100 |
| C12 (The present invention) | KI-50 | Cu(NO3)2-50 | 100 | 100 | 100 | 100 | 100 | 100 |
| C13 (The present invention) | KI-50 | ZnSO4-50 | 100 | 100 | 100 | 100 | 100 | 100 |
| C14 (The present invention) | NH4I-50 | FeSO4-50 | 100 | 100 | 100 | 100 | 100 | 100 |
| C15 (The present invention) | BaI-50 | FeSO4-50 | 100 | 100 | 80 | 100 | 100 | 89 |
| C16 (The present invention) | I2-5 KI-10 | FeSO4-10 | 100 | 100 | 100 | 100 | 100 | 100 |
| C17 (The present invention) | I2-5 NH4I-10 | FeSO4-10 | 100 | 100 | 100 | 100 | 100 | 100 |
| D1 (The present invention) | KI-5 | FeSO4-50 | 100 | 98 | 65 | 100 | 88 | 60 |
| D2 (The present invention) | KI-10 | FeSO4-50 | 100 | 100 | 79 | 100 | 100 | 81 |
| D3 (The present invention) | KI-50 | FeSO4-50 | 100 | 100 | 100 | 100 | 100 | 100 |
| D4 (The present invention) | KI-50 | FeSO4-5 | 100 | 100 | 83 | 100 | 100 | 84 |
| D5 (The present invention) | KI-50 | FeSO4-10 | 100 | 100 | 100 | 100 | 100 | 100 |
| D6 (The present invention) | KI-5 | FeSO4-5 | 100 | 85 | 77 | 100 | 78 | 61 |
| D7 (The present invention) | KI-5 | Fe2(SO4)3-50 | 100 | 93 | 81 | 100 | 96 | 86 |
| D8 (The present invention) | KI-10 | Fe2(SO4)3-50 | 100 | 100 | 93 | 100 | 100 | 85 |
| D9 (The present invention) | KI-50 | Fe2(SO4)3-5 | 100 | 100 | 95 | 100 | 100 | 83 |
| D10 (The present invention) | KI-50 | Fe2(SO4)3-10 | 100 | 100 | 98 | 100 | 100 | 100 |
| D11 (The present invention) | KI-5 | Fe2(SO4)3-5 | 100 | 93 | 75 | 100 | 90 | 71 |
| D12 (The present invention) | KI-5 | Fe2(SO4)3-50 | 100 | 90 | 68 | 100 | 79 | 57 |
| D13 (The present invention) | KI-5 | FeSO4-250 | 100 | 95 | 73 | 100 | 88 | 70 |
| D14 (The present invention) | KI-250 | FeSO4-5 | 100 | 100 | 100 | 100 | 100 | 100 |

EXAMPLE 2

Packed into columns of 1.6 cm in diameter made of glass were 20 ml each of $A_0$, $A_3$, $A_6$, $A_{10}$, $A_{11}$, $B_2$, $B_7$, $B_8$, $B_{11}$, $C_1$, $C_7$, $C_{12}$, $C_{14}$, $C_{17}$, $D_3$, $D_8$ and $D_{13}$ set forth in the above Table 1, and the atmospheric air (with relative humidity of 60%) of 30° C. containing 10 ppm of $B_2H_6$, 10 ppm of $H_2Se$ or 10 ppm of $SbH_3$ was passed through the respective columns at a linear flow rate of 30 cm/sec to conduct the individual break-through adsorption tests for $B_2H_6$, $H_2Se$ or $SbH_3$, whereby the lengths of time until $B_2H_6$, $H_2Se$ or $SbH_3$ leaked out of the respective columns, (i.e., the lengths of time required until the respective removal ratios reached 95%) were determined. The results are shown in Table 2.

TABLE 2

| Adsorbent | The length of time for which the removal percentages for $B_2H_6$ reached 95% | The length of time for which the removal percentages for $H_2Se$ reached 95% | The length of time for which the removal percentages for $SbH_3$ reached 95% |
|---|---|---|---|
| $A_0$ (Control) | 1/6 | 1/4 | 1/3 |
| $A_3$ (The present invention) | 63 | 41 | 55 |
| $A_6$ (The present invention) | 43 | 40 | 48 |
| $A_{10}$ (The present invention) | 75 | 78 | 80 |
| $A_{11}$ (The present invention) | 30 | 28 | 30 |
| $B_2$ (The present invention) | 19 | 30 | 45 |
| $B_7$ (The present invention) | 25 | 19 | 24 |
| $B_8$ (The present invention) | 21 | 20 | 20 |
| $B_{11}$ (The present | 28 | 32 | 19 |

TABLE 2-continued

| Adsorbent | The length of time for which the removal percentages for $B_2H_6$ reached 95% | The length of time for which the removal percentages for $H_2Se$ reached 95% | The length of time for which the removal percentages for $SbH_3$ reached 95% |
| --- | --- | --- | --- |
| invention) | | | |
| $C_1$ (The present invention) | 153 | 198 | 185 |
| $C_7$ (The present invention) | 258 | 250 | 233 |
| $C_{12}$ (The present invention) | 218 | 200 | 223 |
| $C_{14}$ (The present invention) | 300 | 310 | 305 |
| $C_{17}$ (The present invention) | 313 | 300 | 320 |
| $D_3$ (The present invention) | 355 | 368 | 390 |
| $D_8$ (The present invention) | 370 | 373 | 398 |
| $D_{13}$ (The present invention) | 195 | 210 | 195 |

What is claimed is:

1. A process of removing one or more hydrides selected from the group consisting of hydrides of As, B, P, Sb and Se from a gas containing oxygen and one or more of said hydrides, which comprises contacting said gas with an adsorbent comprising activated carbon having (1) iodine and/or one or more iodine compounds and/or (2) one or more members selected from the group consisting of sulfates and nitrates of $NH_4$, Ag, Al, Ti, V, Cr, Mn, Fe, Co, Ni, Cu, Zn, Cd, Pb and Sn supported thereon.

2. A process as claimed in claim 1, wherein the adsorbent is one comprising activated carbon having (1) 1 to 500 mg of iodine and/or one or more iodine compounds and/or (2) 1 to 500 mg of one or more members selected from the group consisting of sulfates and nitrates of $NH_4$, Al, Ti, V, Cr, Mn, Fe, Co, Ni, Cu, Zn, Cd, Pb, and Sn supported thereon, per g of activated carbon.

3. A process as claimed in claim 1, wherein the adsorbent is one comprising activated carbon having (1) 1 to 500 mg of iodine and/or one or more iodine compounds and/or (2) 0.5 to 250 mg of one or more members selected from the group consisting of sulfate and nitrate of Ag supported thereon, per g of activated carbon.

4. A process as claimed in claim 1, wherein the adsorbent is one comprising activated carbon having iodine and potassium iodide supported thereon.

5. A process as claimed in claim 1, wherein the adsorbent is one comprising activated carbon having potassium iodide and ferrous sulfate supported thereon.

6. A process as claimed in claim 1, wherein the gas is contacted with the activated carbon at a temperature of not higher than 150° C.

* * * * *